United States Patent [19]

McCambridge

[11] 4,160,494

[45] Jul. 10, 1979

[54] FLUID-DYNAMIC EMERGENCY BRAKES

[76] Inventor: Joseph McCambridge, 12 Watson La., Setauket, N.Y. 11733

[21] Appl. No.: 819,938

[22] Filed: Jul. 28, 1977

[51] Int. Cl.² .................. B60R 19/02; B61F 19/04
[52] U.S. Cl. .................. 188/270; 46/202; 180/903; 296/1 S
[58] Field of Search .......... 188/270; 296/1 S; 180/1 FV; 244/42 DA; 46/202

[56] References Cited

U.S. PATENT DOCUMENTS

| 2,979,165 | 4/1961 | McCambridge | 188/270 |
| 3,791,468 | 2/1974 | Bryan, Jr. | 188/270 |
| 3,894,764 | 7/1975 | Powell | 188/270 |

*Primary Examiner*—Richard A. Bertsch
*Attorney, Agent, or Firm*—Kevin Redmond

[57] ABSTRACT

An airfoil, pivotally attached to a high speed vehicle, is positioned to produce a braking action on the vehicle by means of fluid-dynamic resistance. The airfoil may be positioned to produce a downward pressure on the vehicle and thus enhance conventional braking action. The braking action is further augmented by eductors which reduce the air pressure behind the airfoil and control the air flow about the airfoil. The eductors and a set of rudders combine to provide the requisite stability for successful high speed braking.

19 Claims, 11 Drawing Figures

FLUID-DYNAMIC EMERGENCY BRAKES

BACKGROUND

1. Field

This invention pertains to fluid-dynamic brake methods for high speed vehicles such as racing cars and boats and may also be applied to high speed conventional automobiles.

2. Prior Art

Airfoil attachments to high speed vehicles have long been used as an aid to stability and braking; however, the airfoil, when used as a braking member, has usually been positioned so that it also provided lift to the vehicle which, unfortunately, increased instability and decreased the ability of vehicle to brake in a conventional manner. Automobiles when entering upon slippery surfaces at high speeds, generally have no effective means of control.

Previously conceived fluid-dynamic braking systems for conventional automobiles have often been avoided because of their high cost, and undesired effect on styling.

SUMMARY

According to this invention, a fluid-dynamic brake system comprising an airfoil is positioned at an obtuse angle with respect to upper, forward surface of the car to produce a downward pressure and as well as a braking action on the vehicle. In addition, rudders and eductors are incorporated to provide for controlled flow of the air about the vehicle and thus enhance stability.

The undesired effects on styling and overall cost caused by the installation of prior art types of fluid-dynamic brakes on conventional automobiles is overcome by using standard portions of the vehicle to provide fluid-dynamic braking as well as their normal function.

DRAWINGS

DETAILED DESCRIPTION OF THE INVENTION

Figure 3:
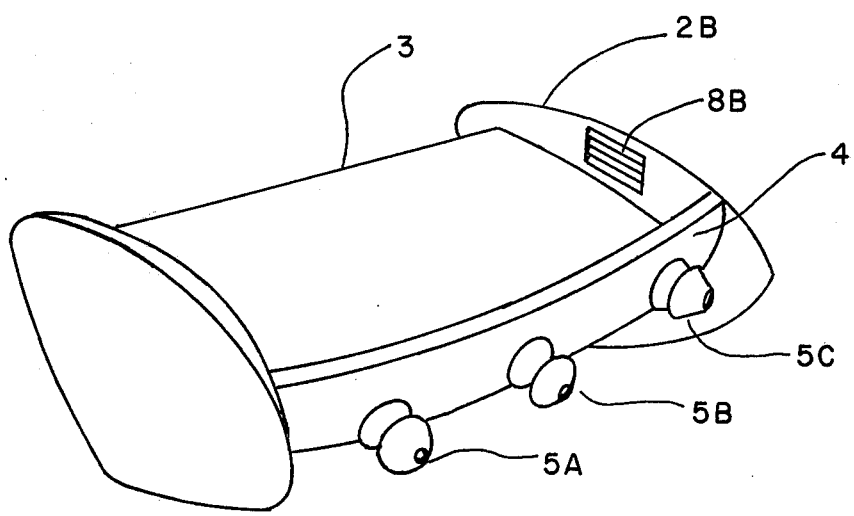
FIG. 3 is a detailed pictorial view of the present invention.

Referring to FIG. 3, a preferred embodiment of the present invention is shown comprising a wing 3, an elevator 4, rudders 2A and 2B, eductors 5A, 5B, and 5C, and an outlet port 8B.

Figure 4:
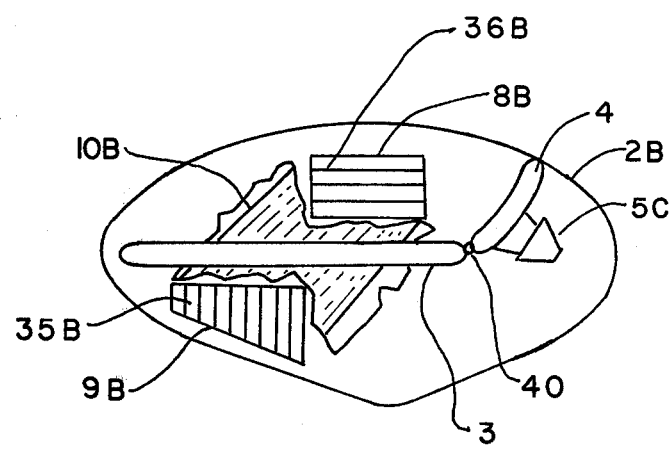
FIG. 4 is a side view of a rudder used in the invention shown in FIG. 3.

FIG. 4 is a more detailed side view of the rudder 2B. In the lower left portion of this rudder is an inlet port 9B. Above and to the right of the inlet port 9B is the outlet port 8B. An internal duct 10B connects the inlet and outlet ports. The wing 3 and the elevator 4 are joined by a pivotal connection 6. In a simplified version of the invention, the wing and elevator may be made as one continuous member, eliminating the pivotal connection 6.

Figure 5:
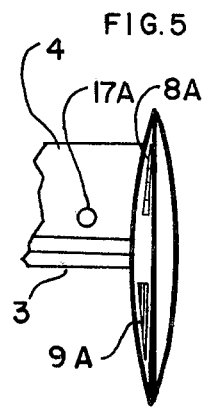
FIG. 5 is a front view of the rudder shown in FIG. 4.

FIG. 5 is primarily detailed view of the front of the rudder 2A. This Figure shows the front view of the rudder inlet port 9A, the rudder outlet port 8A, and the inlet port 17A of the eductor 5A. The fluid-dynamic brake of FIG. 3 may be mounted in various positions on the vehicle which permit the brake to be adjusted to produce a resistance to fluid flow about the vehicle. The portion of the wing 3 away from the elevator is the leading edge of the device. The leading edge is faced in the direction the vehicle is intended to travel.

Figure 1:
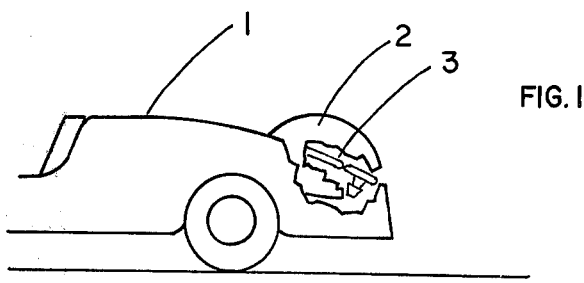
FIG. 1 is a side view of the rear portion of a racing car with the present invention shown attached and placed in its stored position.
Figure 2:
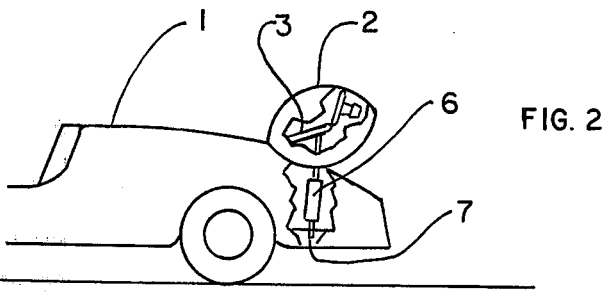
FIG. 2 is a side view of the rear portion of a racing car with the present invention shown attached and placed in its operative position.

One mounting position over the upper rear surface of a vehicle is shown in FIGS. 1 and 2. In FIG. 1, the wing and elevator lay flush with the upper surface of the vehicle. In this position they offer no effective resistance to the flow of air. In FIG. 2, both the wing and elevator are raised to offer resistance to the flow of air and thereby provide a braking action. The obtuse angle made by the wing with respect to the body also produces a downward pressure on the vehicle to aid in conventional braking.

Referring now to FIG. 3, as air flows over the fluid dynamic brake the elevator, in its raised position as shown, offers resistance to the flow of the air producing a drag or braking action on the vehicle. The eductors 5A, 5B, 5C, provide an additional braking action by reducing the pressure on the rear of the elevator. The operation of the eductors will be discussed later. The eductors are symmetrically or evenly spaced about the elevator to provide stability. Symmetrical spacing, as used herein, is intended to indicate a uniform distribution. This type of spacing in itself prevents uneven dynamic braking and prevents buffeting by providing a controlled flow of air through the eductors. Buffeting occurs on surfaces where no provision is made for the flow of trapped air. The air generally attempts to pass over the edges of the surface on which it is trapped, causing great pressure in localized areas near the edge. This pressure causes the surface to deform or change position. A change in position may be caused by the vehicle being pushed downward by the airflow over the airfoil. The deformation or position change in turn causes the air to flow in a different direction from the direction it followed before deformation. This releases the stress which caused the deformation and the deformation is eliminated. At this point, the cycle is ready to begin again. If the cycle is repeated rapidly the surface will continually be in a state of vibration which can lead to the destruction of the airfoil. The eductors direct the flow of the trapped air away from the airfoil edge where deformation is liable to occur, thereby avoiding buffeting.

As shown in connection with FIG. 2, the obtuse angle which the elevator makes in its operative position with respect to the body of the vehicle provides a downward thrust on the vehicle to aid in conventional braking. Many prior art systems place the braking airfoil at an acute angle with respect to the vehicle, making the airfoil surface provide lift which tends to reduce conventional braking. For example, an automobile which enters upon a wet or icy surface at high speed may have impaired conventional braking because of the lubricating effect of the water or ice. Application of the brakes under such circumstances may have only a marginal effect. A prior art airfoil braking system would function as a brake, but if the airfoil is positioned at an acute angle with respect to the vehicle it would tend to lift the vehicle away from the surface. This may not only make the conventional braking totally inoperative, but may also aid in causing the vehicle to lose complete steering control. The present invention not only provides fluid-dynamic braking but also provies a downward pressure on the vehicle to aid conventional braking by virtue of the obtuse angle the elevator makes with respect to the vehicle.

Returning to FIG. 4, the inlet duct 9B contains a number of vanes 35B, positioned to direct the air into the inlet port. This air is transmitted through the internal duct 10B to the outlet port 8B which also contains a number of vanes 36B positioned to direct the air captured by the inlet port 9B downward onto the surface of the wing 3. This direction of flow of air through outlet port and down on the wing causes an additional downward pressure on the wing because of the direction of the air flow from the outlet port and also because the air which would ordinarily flow beneath the wing is removed. This causes the pressure beneath the wing to be reduced and thereby adds to the downward pressure on the vehicle.

Figure 6:
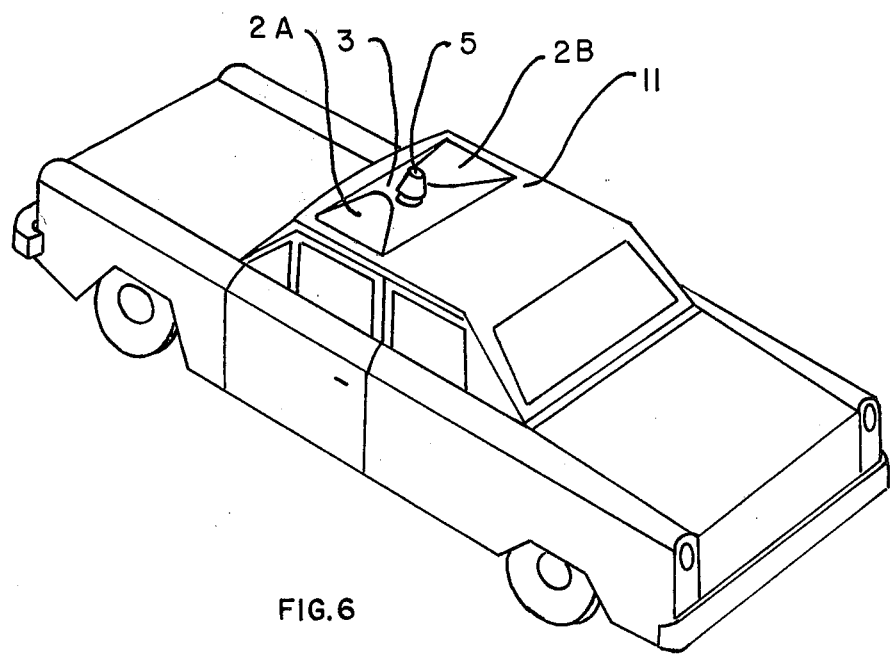
FIG. 6 illustrates the invention in its stored position as installed on a roof of a conventional automobile.
Figure 7:
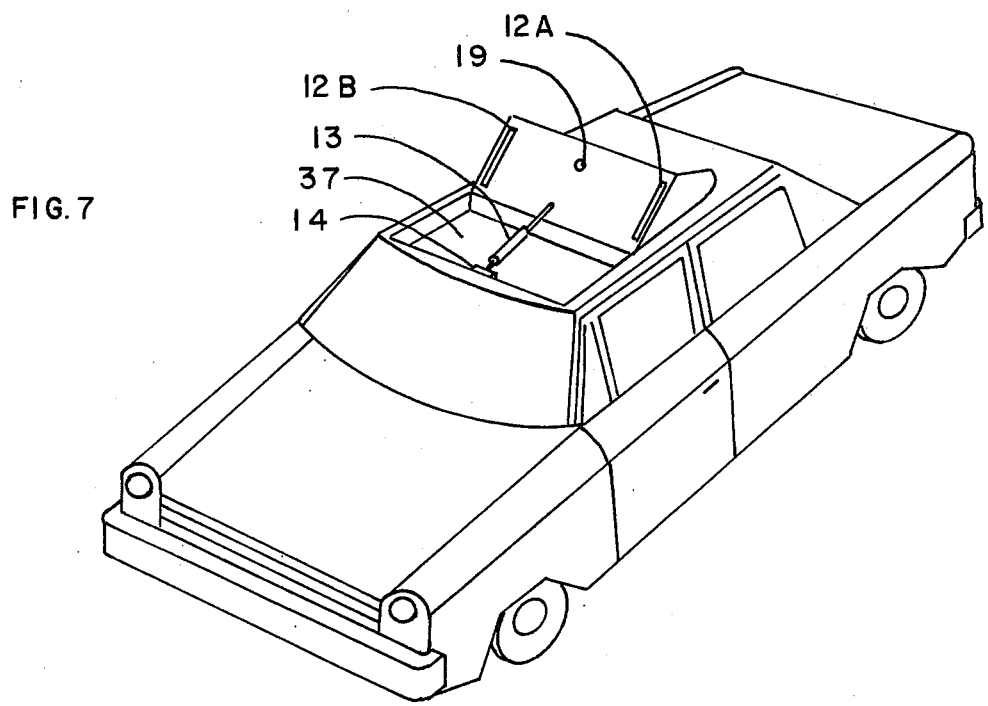
FIG. 7 illustrates the invention on the roof of a conventional automobile in its operative position.

FIGS. 6 and 7 show a variation of the present invention adapted for use on the roof above the passenger compartment of a conventional automobile. In FIG. 6, a conventional automobile 11 includes a fluid-dynamic brake comprising the wing 3, rudders 2A and 2B, and an eductor 5. In FIG 6, the rudders 2A and 2B are folded down to present a surface that is flush with remainder of the roof. In FIG. 7, the wing has been opened to an obtuse angle with respect to the forward roof of the automobile and the rudders have been folded out to provide stabilizing surfaces. In addition to including the eductor 5, the wing includes slots 12A and 12B adjacent the point of connection of the rudders to the wing to further aid in the control of air escaping from the surface of the wing. Air flowing through the slots passes by the rudder surfaces and thereby provides an additional aid to the stability of the vehicle.

The complete assembly is stored in a compartment 37 in the roof above the passenger compartment. At the forward edge of this storage compartment 37 is a latching mechanism 14 which holds the wing in its stored position until the latch is released. Attached to the lower surface of the wing is a hydraulic return mechanism 13.

Figure 8:
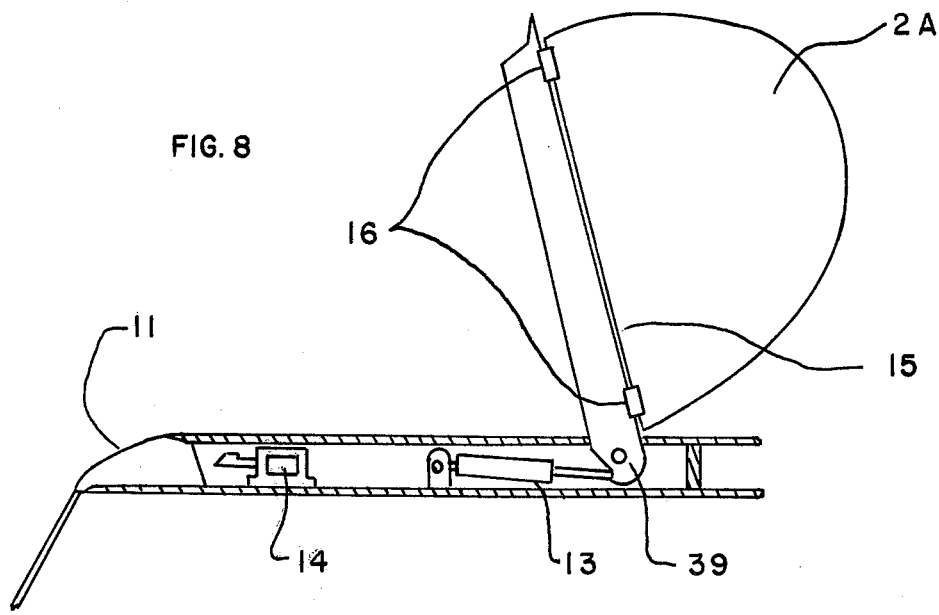
FIG. 8 is a detailed cross sectional view of the invention as used on a conventional automobile in its operative position.
Figure 9:
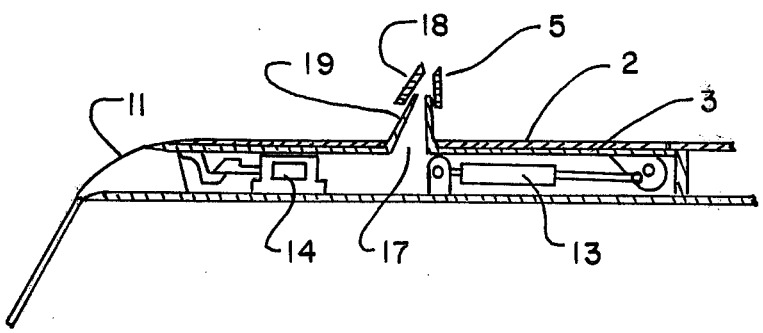
FIG. 9 is a detailed cross sectional view of the present invention as used on a conventional automobile roof in its stored position.

FIGS. 8 and 9 are cross sectional views of the invention illustrated in FIGS. 5 and 6. FIG. 9 shows the wing and rudders in their stored position while FIG. 8 shows the wing and rudders in a midway position between stored and fully open to an obtuse angle.

The system of FIG. 8 comprises the latching mechanism 14, the hydraulic return mechanism 13, the wing 3, the rudder 2A, a first pivotal connection 15 between the wing 3 and the rudder 2A, the latching devices 16 for the rudder 2B and a second pivotal connection 39 for securing the wing to the vehicle.

In the stored position of the invention shown in FIG. 9, the rudder 2 is folded down adjacent the wing 3. This position of the rudders provides a clear view of the eductor 5 which can be seen to comprise an inner cone 19 and outer cone and nozzle 18.

In the operation of the invention shown in FIGS. 6 through 9, the wing is released from its stored position by releasing the latching mechanism 14 which contains a spring or other suitable device to raise the airfoil slightly so that it will be caught by the air stream. The latch is actuated by any standard control mechanism (not shown) such as a release handle within the vehicle. Fluid passing over the vehicle impinges on the leading edge of the wing 2 to force the wing to its upright position, as shown in FIG. 8. Continued pressure by the air flow forces the wing to the obtuse angle shown in FIG. 7. Air passes through slots 12A and 12B applying pressure on the folded rudders 2A and 2B overcoming the force of the latching mechanism 16 and positioning the rudders at right angles to the surface of the wing. The latching mechanism 16 is designed to have two holding positions. The first is used to hold the rudders in the stored position and in line with roof contour. The second holds the rudders in the right angle position until they are to be refolded for storage against the wing surface.

Hydraulic device 13 is designed to accomplish several tasks. During the opening of the wing, the device 13 is used as a hydraulic damping device to prevent too rapid a motion in the opening. This device also contains a resilient element such as a spring which adjust the angle of the wing in accordance with the pressure on the wing. For example, at high speeds, where the fluid pressure on a wing may exceed the strength of the wing, the resilient element permits the wing to lay closer to the roof at a relatively large, obtuse angle. This prevents the wing from being damaged by the high speed air flow. Finally, the hydraulic device 13 is actuated as a hydraulic cylinder for returning the wing to its store position.

The eductor shown in FIG. 9 produces a reduced pressure behind the wing when the wing is raised to its operating position. Air enters the eductor inlet portion and passes through the inner cone 19 and the outer cone 18. A reduce pressure is produced between the inner and outer cones because of the airflow through the eductor in accordance with Bernoulli's Theorum. The reduced pressure draws air from behind the wing, reducing the pressure in this area and thus increasing the braking action. The operation of the eductor is described in more detail in my previous U.S. Pat. No. 2,979,165.

Figure 10:
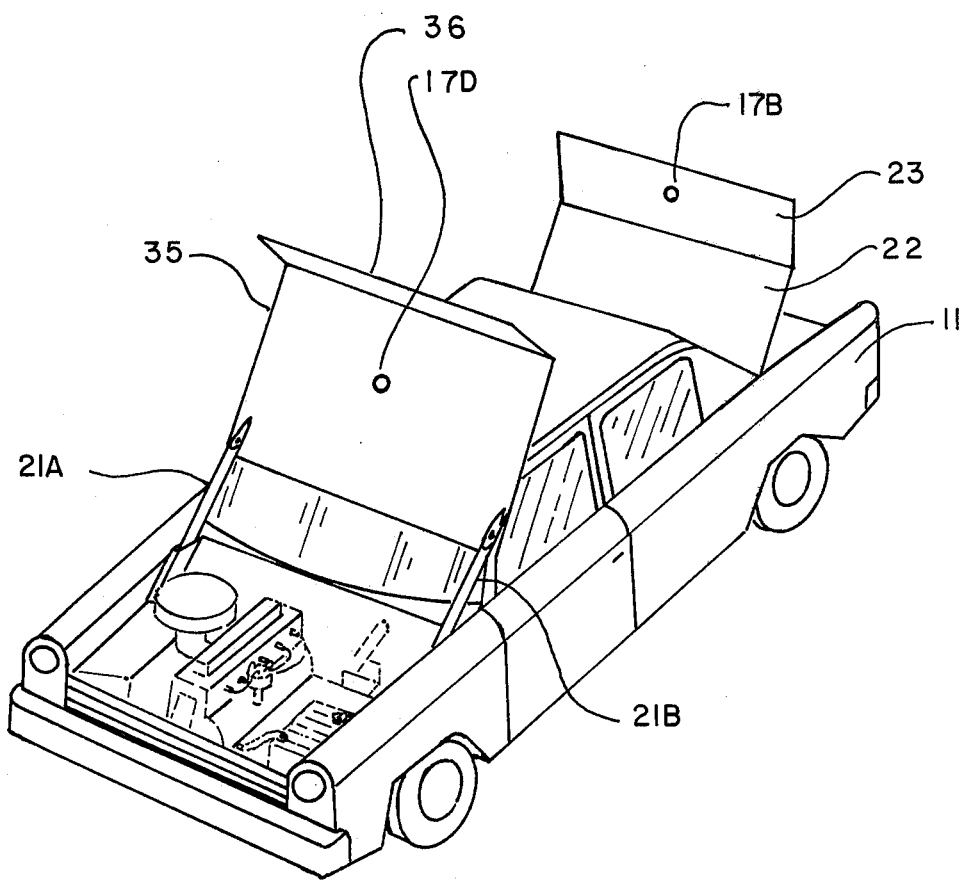
FIG. 10 illustrates a conventional automobile with the hood and trunk modified for use as dynamic brakes.

FIG. 10 shows a conventional automobile with the hood and trunk modified for use as wing surfaces to provide fluid-dynamic braking system with no appreciable adverse effects on styling or cost. Essential elements in this system include the car 11, hood support arms 21A and 21B, the automobile hood 35, the forward lip of the hood 36, an eductor input port 17D, a rear trunk cover with an upper surface 22 and a rear surface 23, eductor intake port 17E and the forward windshield of the automobile 20.

In the operation of the system shown in FIG. 10, the hood release, which is standard in most cars, is modified to be capable of completely releasing the hood by means of a control within the car so that air pressure may enter under the forward lip and force the hood upward. The rear pivotal mounts for the hood are not directly connected to the body of the automobile, but instead are mounted to support arms which are slideably mounted to the car body. The air pressure on the hood force the slideably mounted support arms upward so that there is a clear viewing area between the lower edge of the hood and the engine to enable the operator to view the road despite the fact that the hood is raised. The springs normally used to support the hood are modified to permit the hood to form an obtuse angle with the upper surface of the automobile so that a downward pressure can be exerted on the car to aid conventional braking. As the air pressure is reduced with reduced speed of the vehicle, the hood is moved forward by the springs to provide a maximum of braking surface. The hood also includes an eductor to increase the stability and braking force as described previously.

The rear trunk cover may also be modified to function as a fluid-dynamic brake, as shown in FIG. 10. The essential elements in this system are the upper surface of the rear trunk cover 22, the rear surface of the rear trunk cover 23, and an eductor inlet port 17E.

In the operation of the rear trunk lid as a fluid-dynamic brake, the trunk is forced up by such means such as a hydraulic cylinder, controlled from within the automobile. In addition, the rear trunk surface is hinged along the edge where it joins the upper trunk surface so that it may be pivoted to stand vertically with respect to the automobile itself. In this position, the rear trunk cover functions in a manner similar to the fluid-dynamic brakes shown in FIGS. 1 and 2. The upper trunk surface 22 functions as the wing, while the rear trunk surface 23 functions as the elevator.

This basic design can be further improved in a number of ways which do not appreciably effect the cost or styling. For example, the fins often located over the rear fenders of cars for decorative purposes may be combined with the trunk cover to form stabilizing rudders such as shown in FIGS. 1 and 2.

It should be noted that the use of the hood and trunk as braking members does not affect or mar the styling of the automobile as all of the functions necessary to operate these surfaces as brakes can be effectively hidden when the surfaces are returned to their normal storage positions. In addition, modifications to the car required for this type of fluid-dynamic braking are minimal. This is especially true for the front hood because in most conventional automobiles, a hood release device is present and would require minor modification to make it suitable for the present invention. Only the rear mounting would require somewhat more modification to make the hood suitable; however, this can be accomplished in a relatively simple manner as will be described below.

The rear trunk may be further modified to provide additional braking by including support arms to raise the trunk surface above the passenger compartment. An economic advantage can be gained where a similar type of support arm is used for both forward and rear brakes.

Figure 11:
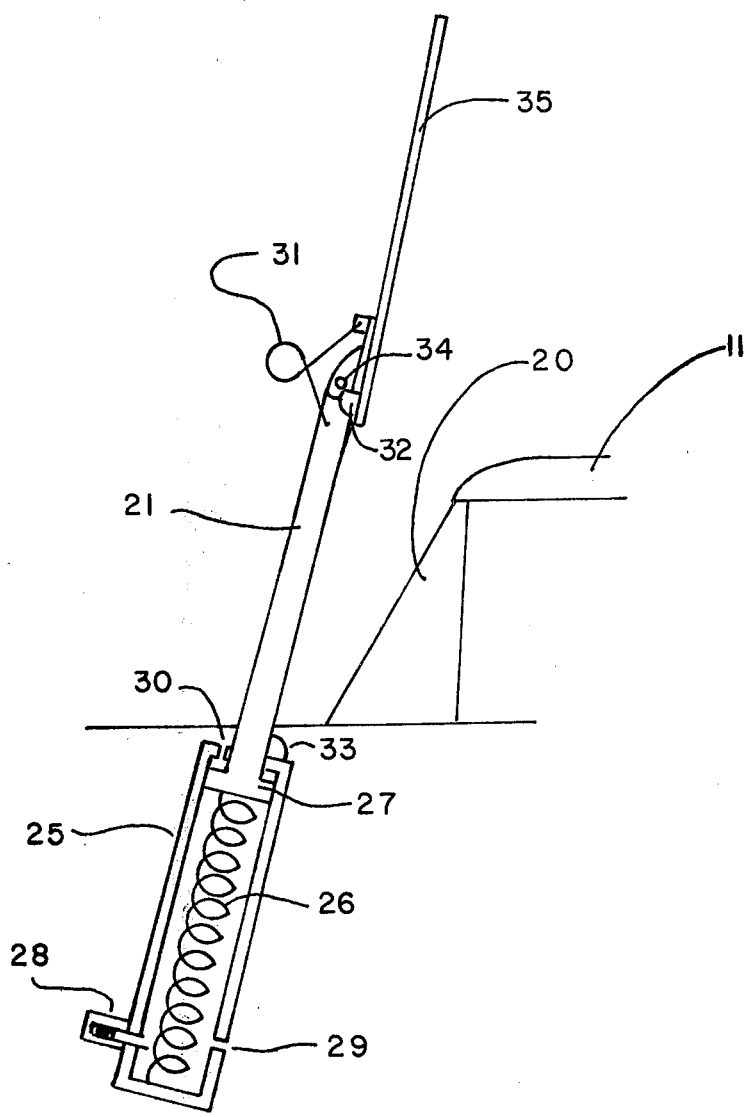
FIG. 11 is a detailed cross sectional view of a hood support device.

FIG. 11 shows one method of implementing support arms suitable for both forward and rear fluid-dynamic brakes. The support arm system shown in FIG. 11 comprises a hydraulic cylinder 25, hydraulic inlet and output ports 29 and 30, resilient means 26, latching means 28, support arm base 27, cams 32 and 33, support arm 21, pivotal means 34, hood spring 31, and hood 35.

The arm 21 is shown in its fully released position in FIG. 11. In this position, it supports the hood above the windshield 20 to provide a clear view for the operator of the vehicle 11. In the stored position, the arm 21 is forced down into the hydraulic cylinder 25 so that the base 27 lies below the latching means 28. When the latching means 28 is released the base 27 is forced by the resilient means 26 upward towards its position as shown in FIG. 11. The rate of advance through the cylinder is retarded by restricting the rate at which hydraulic fluid within the cylinder is released through port 30. To drive the support arm back into the cylinder 25 toward the stored position, a fluid is forced into port 30 to apply pressure to the upper surface of the arm base 27, until it is latched beneath the latching mechanism 28.

The upper portion of the support arm contains a pivotal means 34 to connect the hood to the arm 21. A hood spring means 31 is designed to raise the hood in the normal manner when it is open for servicing. During normal engine serving the support arm is held in its stored position. The pivotal means 34 and the hood spring means 31 are designed to permit the hood to fold back over the passenger compartment at an obtuse angle. As described previously, the particular angle is dependent upon the speed of the car. At high speeds the force of the air over the angle will be high; however, as the speed is reduced the hood is raised automoatically by the spring 31 to present the maximum braking surface. The cam 33 and 32 interact when the arm is driven into its stored position to force the hood down over the engine.

The support arm of FIG. 11 may also be used for the rear trunk cover. The most important conceptual change required for use in the rear is simply a rotation of the arm through 180° about its vertical axis.

I claim:

1. Apparatus for fluid-dynamic braking of a high speed vehicle comprising:
   (a) a wing member attached to said vehicle and positioned generally transversely across said vehicle,
   (b) an elevator attached to the rear portion of said wing member,
   (c) a rudder attached to said wing member and positioned generally in the vertically plane,
   (d) an eductor symmetrically positioned in said elevator surface,
   (e) means for positioning the upper surface of said elevator surface at an angle in the range from 0° to 180° with respect to the upper surface of said wing member, and
   (f) means for positioning said wing at an obtuse angle to said vehicle.

2. Apparatus as claimed in claim 1, further comprising:
   (a) an inlet port located generally in the lower forward portion of said rudder, position to capture fluid impinging on said port, due to the motion of said vehicle,
   (b) an outlet port positioned on the upper side of said rudder facing over the upper side of said wing member,
   (c) duct means within said rudder connecting said inlet and outlet ports, to conduct the fluid captured in said inlet ports to said outlet port, and (d) means for directing the outward flow of fluid from said outlet port downward on the upper surface of said wing member.

3. Apparatus as claimed in claim 2, wherein said means for directing the outward flow of fluid comprises a plurality of vanes located in the outlet duct.

4. Apparatus as claimed in claim 2, further comprising a plurality of vanes in the inlet port position to aid in capturing inlet fluid.

5. Apparatus as claimed in claim 2, wherein said means for positioning said elevator is rigid mechanical connection to hold said elevator at a fixed angle with respect to said wing member.

6. Apparatus as claimed in claim 2, wherein said means for positioning said elevator is a variable hydraulic means to position said elevator at any angle in said range.

7. Apparatus as claimed in claim 2, further comprising means for adjusting the angle of attack of said wing with respect to the surface of said vehicle.

8. Apparatus as claimed in claim 7, wherein the leading edge of said wing is pivotally mounted to said vehicle.

9. Apparatus as claimed in claim 8, wherein said means for positioning said wing includes a spring connected to said vehicle and to said wing and said spring is biased to place said wing in a braking position when released.

10. Apparatus as claimed in claim 8, wherein said means for positioning said wing includes a hydraulic cylinder connected to said vehicle and said wing.

11. Apparatus as claimed in claim 8, wherein said means for positioning said wing and said elevator are a common means comprising a spring connected to said vehicle and said elevator and biased to place said elevator and said wing in a braking position.

12. Apparatus as claimed in claim 2, characterized in that said wing member and rudder in a stored, closed position form a part of the outer portion of the car and the outer surface of the wing member is flush with the adjacent outer surface of said vehicle.

13. Apparatus for fluid-dynamic braking of a high speed vehicle comprising:
(a) a wing member positioned transversely across said vehicle and pivotally attached along its rear edge to said vehicle,
(b) an eductor symmetrically located in said wing member,
(c) a rudder pivotally attached to the rear of said wing member, said rudder lying generally parallel to said wing member in a storage position and pivoting to a generally perpendicular position with respect to the wing member and vertically with respect to the vehicle in a operational position,
(d) a slot in said wing member positioned adjacent to said rudder and aligned parallel to said rudder in its operate position,
(e) releasable locking means to secure said rudder in its stored and operational position,
(f) latching means to secure the forward edge of said wing member to the vehicle in a stored position, and
(g) resilient means included in said latching means to project the leading edge of said wing into the fluid stream upon the release of said latching means.

14. Apparatus for fluid-dynamic braking of a high speed vehicle, comprising:
(a) the hood over a forward portion of said vehicle,
(b) means for pivotably connecting said hood along its rear edge to said vehicle,
(c) latching means for holding the hood in its stored position down and over the forward portion of the vehicle,
(d) control means for releasing said latching means by the operator from within the vehicle to completely free said hood and permit it to raise to a braking position by means of airflow impinging on said hood,
(e) a movable arm connected at one end to said means for pivotally connecting said hood to said vehicle and slideably connected to said vehicle at the other end,
(f) means for positioning said arm in a generally vertical direction with respect to the upper surface of the vehicle, and
(g) means for driving said arm in a generally vertical direction to provide a viewing space between the upper forward portion of the vehicle and the operator compartment.

15. Apparatus as claimed in claim 14, wherein said means for pivotally connecting said hood permits rotation of said hood to an obtuse angle with respect to the upper surface of the engine compartment.

16. Apparatus as claimed in claim 15, wherein said pivotal means includes resilient means for self-adjusting the angle of the hood in accordance with the fluid pressure on said hood for maximum braking within the limits of the strength of the hood and said means for pivotal connection of the hood to said vehicle.

17. Apparatus as claimed in claim 16, further comprising:
(a) means for controlling said means for driving said arm from within the passenger compartment of said vehicle, and
(b) an eductor geometrically positioned on said hood.

18. Apparatus for dynamically braking a high speed vehicle comprising:
(a) a rear trunk cover,
(b) means for pivotally attaching said cover along its forward edge to said vehicle,
(c) means for latching said cover to said vehicle in a normal stored position adjacent said vehicle,
(d) means within the passenger compartment for releasing said means for latching, and
(e) means for raising said cover about said pivotal means against the fluid resistance caused by the movement of said vehicle.

19. Apparatus as claimed in claim 18, further comprising means for raising said pivotal means above the passenger compartment or other obstruction to maximize the braking effect.

* * * * *